J. M. H. JACOBS.
STEERING DEVICE.
APPLICATION FILED SEPT. 1, 1917.

1,342,385.

Patented June 1, 1920.

Witnesses

Inventor
James M. H. Jacobs
By Kerr, Page, Cooper & Hayward
Attorneys

UNITED STATES PATENT OFFICE.

JAMES M. H. JACOBS, OF DAYTON, OHIO, ASSIGNOR, BY MESNE ASSIGNMENTS, TO DAYTON-WRIGHT COMPANY, OF DAYTON, OHIO, A CORPORATION OF DELAWARE.

STEERING DEVICE.

1,342,385. Specification of Letters Patent. Patented June 1, 1920.

Application filed September 1, 1917. Serial No. 189,244.

*To all whom it may concern:*

Be it known that I, JAMES M. H. JACOBS, a citizen of the United States of America, residing at Dayton, county of Montgomery and State of Ohio, have invented certain new and useful Improvements in Steering Devices, of which the following is a full, clear, and exact description.

The present invention relates to an improvement in steering devices, and more particularly to steering devices for vehicles such as aeroplanes.

It is among the objects of the present invention to provide an improved steering device which will be safe, sure and efficient in operation.

Further objects and advantages will be apparent from the accompanying drawings, wherein one preferred form of embodiment of the present invention is clearly illustrated.

Figure 1:
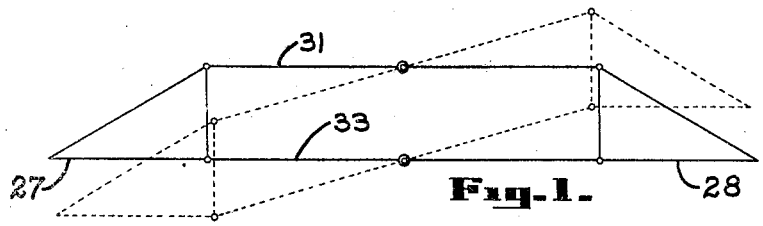
Figure 1 is a diagrammatic view of my improved steering device, the full line position indicating the normal position, and the dotted line position indicating one of its operative positions.

Referring to the drawing, and particularly to Figs. 2 to 5 inclusive, there is illustrated an improved steering mechanism, adapted primarily to be combined with aeroplanes to control the direction of flight thereof.

Figure 2:
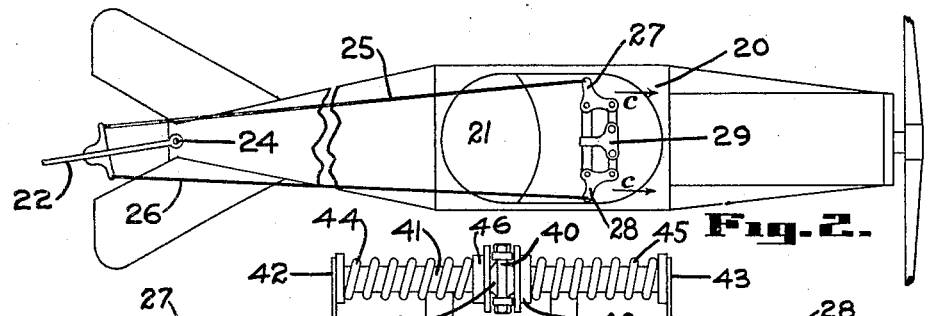
Fig. 2 is a fragmentary view of the fuselage of an aeroplane, showing the arrangement of the steering device relative to the operator's seat and the rudder.
Figure 3:
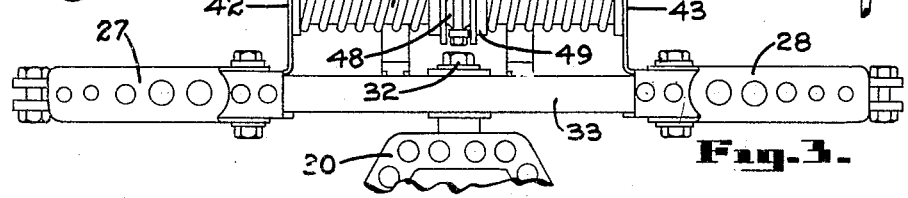
Figs. 3, 4 and 5 are detail views of the steering device.

The numeral 20 in Fig. 2 designates the fuselage of the aeroplane, while the numeral 21 indicates the seat for the driver or operator. The numeral 22 designates the rudder which is generally positioned at the rear of the fuselage and pivotally mounted thereon, as at 24. This rudder has a pair of flexible cables or cords 25 and 26 secured to each side thereof, which extend forward and are connected with the extreme ends of the foot pedals or plates 27 and 28 respectively, of the steering device 29.

This steering device includes a base or standard 30, which is preferably mounted on the floor of the fuselage, adjacent to the operator's seat, and in such position relative thereto that the operator may readily actuate the steering device by use of his feet.

The base or standard 30 is adapted to carry the steering bar 31, pivotally secured thereto as at 34. An auxiliary steering bar 33 is also mounted on the base or support, and normally lies parallel with the steering bar 31. This auxiliary bar 33 is also pivotally secured on the base 30, as at 32.

The pedal 27 is pivotally secured to one of the extreme ends of the steering bar 31 and the auxiliary bar 33, while the pedal 28 is pivotally secured to the opposite extreme ends of the steering bar 31 and auxiliary bar 33.

With the above described construction, it will be seen that when the device is in its normal position, the steering bar 31 and the auxiliary bar 33 form the sides of a rectangular body, while the portions 34 and 35, of the pedals 27 and 28 respectively, form the ends of the rectangular body.

Figure 5:
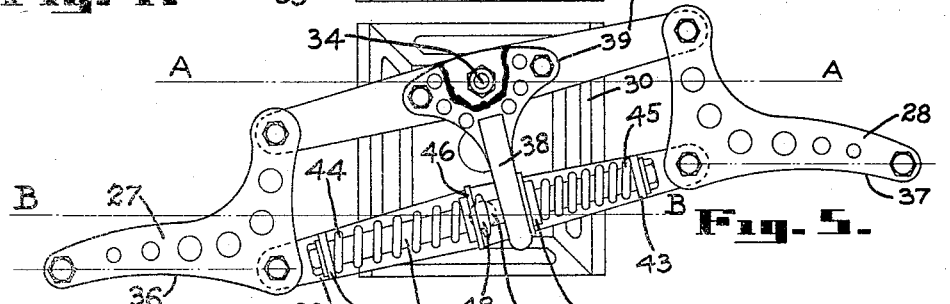

In view of the fact that the extreme ends of the two bars are secured together by a pivotal connection of the foot plates, it will be apparent that any shifting or deflecting of the main steering bar 31 will cause a like shifting of the bar 33, so that these bars will always be maintained in a substantially parallel position, and inasmuch as the pedals 27 and 28 are pivotally secured to each of the bars 31 and 33, they will likewise be maintained in a substantially parallel position, and the tread of the pedals, indicated by the numerals 36 and 37 respectively, will be maintained substantially parallel with a line drawn length-wise through the pivotal connection of the bars 31 and 33, such a line being indicated in Fig. 5 by the lines A—A and B—B.

From the above description, it will be apparent that if the operator desires to shift the rudder of the aeroplane to either the right or left from its normal position, pressure is exerted by the operator on one of the pedals, so as to force said pedal in the direction of the arrow C—C in Fig. 2, and this will cause a shifting of the rudder, due to the connection of the cable or rod from the said pedal to the rudder.

By providing the above construction, substantially all danger of the operator's foot slipping off of the pedal, and coming into contact with the cable or rod which connects the pedal to the rudder, is avoided, inasmuch as the treadle always presents a comparatively straight surface to the feet of the operator, and therefore any tendency for the operator's foot to slip off of the pedal is substantially eliminated.

The present invention also includes a means for centralizing the steering device. That is, a means for returning the steering device and therefore consequently returning the rudder to a normal position, at such times as the operator releases pressure from the steering device.

This centralizing device comprises a pressure bar 38, which is carried by a plate 39, fixed to the steering bar 31. The free end of the pressure bar is bifurcated as at 40, and is adapted to fit around the rod 41, which is rigidly mounted upon the auxiliary bar 33 in the standards 42 and 43.

This bar carries a pair of opposed resilient elements such as springs designated by the numerals 44 and 45 respectively. One of these springs is mounted on each side of the pressure bar, and is normally under tension between the abutments 46 and 47 and the standards 42 and 43 respectively.

The bifurcated portion of the pressure bar fits between the two abutments. These abutments, however, are held against further movement on the bar 41, toward each other, by means of a suitable shoulder or pin 48, see Figs. 3 and 5.

The two springs which are mounted upon the bar 41, are of substantially the same tension and strength, this degree of strength and tension being determined in any suitable manner, previous to the assembling of the steering device.

The operation of the above described centralizing device is as follows:

When the operator exerts pressure against the pedal 28, to shift the steering device to the position shown in Fig. 5, the pressure bar 38 will swing as on a pivot and will tend to compress the spring 45, thereby placing it under greater compression. Now, as soon as the operator tends to release pressure from the pedal 28, this spring tends to expand and will force the pressure bar, and thereby force the steering device back to its normal position.

This will tend, of course, to force the rudder from its adjusted position to any determined normal position, and the rudder will be prevented from fluctuating or vibrating, due to its return movement, by the resistance which will be offered to the pressure bar by the other spring 44, which comes into effect immediately after the pressure bar assumes its central or normal position.

Figure 4:
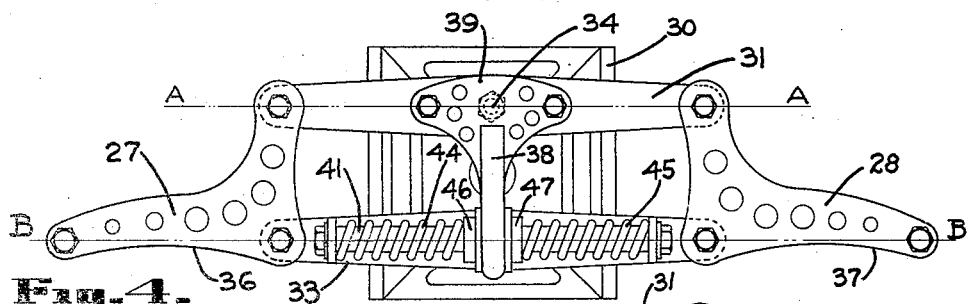

The above described mechanism will tend to maintain the steering device in the central position shown in Fig. 4, except at such times as the operator tends to overcome the effect of either one of the springs, and to adjust the steering device and the rudder to change the course of direction of the aeroplane.

While the form of mechanism herein shown and described constitutes a preferred form of embodiment of the invention, it is to be understood that other forms might be adopted, all coming within the scope of the claims which follow.

What I claim is as follows:

1. In a steering device, the combination with a steering bar pivoted at its central portion, with foot plates attached to the outer extremities of said bar; and means for maintaining said foot plates in a position parallel to the normal or undeflected position of said steering bar, whenever the steering bar is rotated upon its pivot in either direction.

2. In a steering device, the combination with a steering bar, a foot plate attached to the outer extremity of said bar, said bar and foot plate being constructed to move in substantially the same plane; and means for maintaining said foot plate in a position parallel to its normal position, whenever said foot plate is moved from its normal position.

3. In a steering device, the combination with a steering bar pivoted at its central portion; an auxiliary steering bar similarly pivoted at its central portion; foot plates attached to the outer extremities of said steering bar and the auxiliary bar; and means for maintaining said foot plates in a position parallel to the normal or undeflected position of said steering bars, whenever the steering bars are rotated upon their pivots in either direction.

4. In an airplane, the combination with a rudder, of a controlling device therefor, including a support; a steering bar mounted on said support; a pedal mounted on each end of said steering bar, a connection between each pedal and the rudder; and means for maintaining the pedals in a predetermined relative position throughout the range of movement of the steering bar.

5. In an airplane, the combination with a rudder, of a controlling device therefor, including a support; a steering bar mounted on said support, a pedal member mounted on each end of said bar, a connection between each pedal and the rudder; an auxiliary steering bar mounted on the said support, and means for normally maintaining the pedals in normal position including a pair of resilient elements mounted on said auxiliary bar; and a pressure member mounted on said steering bar and adapted to coöperate with the resilient elements to increase the tension of either of these elements when pressure is exerted on the corresponding pedal to shift the rudder.

6. In an airplane, the combination with a rudder; of a controlling device therefor, comprising a support; a steering bar pivotally mounted thereon; an auxiliary steering bar pivotally mounted on said support; and foot plates connecting the corresponding ends of the two said bars.

7. In an airplane, a steering device comprising a plurality of elements arranged in the form of a parallelogram, the four arms of which are pivoted to each other at the corners of the parallelogram; two of the arms being positioned across the airplane and pivoted to a fixed support at substantially their central portions, said pivotal points being arranged along the line of rudder pull; the other two arms having lateral projections extending therefrom to serve as foot rests.

8. In an airplane, the combination with a rudder; of a single controlling device therefor, comprising a support member; a steering bar pivotally mounted thereon; an auxiliary steering bar pivotally mounted on said support; and a foot plate pivotally connected to said bars at each end thereof, each foot plate being pivotally connected to corresponding ends of said bars.

In testimony whereof I affix my signature.

JAMES M. H. JACOBS.

Witnesses:
J. W. McDonald,
Walter H. Riedel.